United States Patent [19]
Pommier et al.

[11] Patent Number: 5,938,724
[45] Date of Patent: *Aug. 17, 1999

[54] REMOTE COLLABORATION SYSTEM THAT STORES ANNOTATIONS TO THE IMAGE AT A SEPARATE LOCATION FROM THE IMAGE

[75] Inventors: Theresa M. Pommier, Westmont; Krista S. Schwartz, Batavia; Allison A. Carleton, Lisle; Catherine M. Fitzpatrick, Winfield, all of Ill.

[73] Assignee: NCR Corporation, Dayton, Ohio

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/825,878

[22] Filed: Apr. 2, 1997

Related U.S. Application Data

[62] Division of application No. 08/033,602, Mar. 19, 1993, abandoned.

[51] Int. Cl.⁶ ..................................................... G06F 13/00
[52] U.S. Cl. ........................... 709/205; 345/330; 345/331; 345/332
[58] Field of Search .................................... 345/330–332; 355/200.34, 200.35; 707/512–516; 709/204, 205

[56] References Cited

U.S. PATENT DOCUMENTS

| | | | |
|---|---|---|---|
| 4,648,067 | 3/1987 | Repass et al. | 364/900 |
| 4,939,509 | 7/1990 | Bartholomew et al. | 340/717 |
| 5,107,443 | 4/1992 | Smith et al. | 395/158 |
| 5,119,319 | 6/1992 | Tanenbaum | 364/514 |
| 5,146,552 | 9/1992 | Cassorla | 395/145 |
| 5,220,657 | 6/1993 | Bly et al. | 395/425 |
| 5,337,407 | 8/1994 | Bates et al. | 395/153 |
| 5,379,374 | 1/1995 | Ishizaki et al. | 395/155 |
| 5,581,682 | 12/1996 | Abderson et al. | 395/792 |
| 5,600,775 | 2/1997 | King et al. | 395/806 |
| 5,608,872 | 3/1997 | Schwartz et al. | 395/200.04 |
| 5,649,104 | 7/1997 | Carleton et al. | 395/200.04 |
| 5,671,428 | 9/1997 | Muranaga et al. | 395/772 |
| 5,704,042 | 12/1997 | Hester et al. | 395/200.34 |
| 5,835,713 | 11/1998 | Fitzpatrick et al. | 395/200.34 |

FOREIGN PATENT DOCUMENTS 0 279 558 A1   8/1988   European Pat. Off. .

OTHER PUBLICATIONS

Sunil Sarin, et al., "Computer–Based Real–Time Conferencing Systems", 1985 IEEE, Oct. 1985, pp. 34–45.

Eliot M. Gold, "Unified Systems Integrate Voice, Data and Images", Networking Management, v8, n12, Dec. 1990, p.28(5).

David M. Stone, "Computing at a Distance", PC Magazine, v6, n6, Mar. 31, 1987, p.249(11).

Timothy Catlin et al., InterNote: Extending a Hypermiedia Framework to Support Annotative Collaboration in Hypertext '89 Proceedings, pp. 365–378, Nov. 1989.

Elie Cassoria et al., Onscreen Possibilities . . . Today! IPCC 86—Int'l Professiona Communication Conference, pp. 11–15, 1986.

*Primary Examiner*—Lance Leonard Barry
*Attorney, Agent, or Firm*—Gates & Cooper

[57] ABSTRACT

A method and system for remote collaboration is disclosed. The method comprises running a remote program on each of a plurality of remote computers coupled to a host computer running a host program that is distinct from the remote program. The host program generates an image that is communicated to the remote programs for output on each of the remote computers' displays. The remote programs each allow the users of the remote computers to independently annotate the image generated by the host computer and output on the remote computers' displays. The remote programs each independently store the image generated by the host program at a first location and store the annotations to the image at a second location separate from the first location. The remote programs each communicate with the host program to cause the selective replication of the annotations at others of the remote computers.

2 Claims, 15 Drawing Sheets

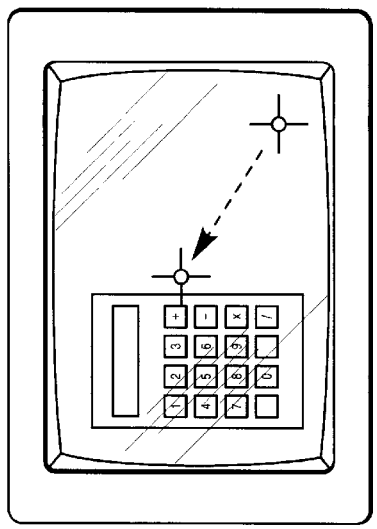
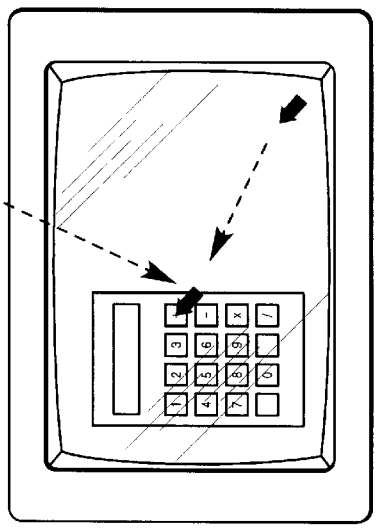
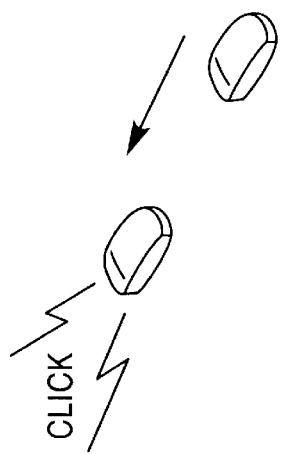
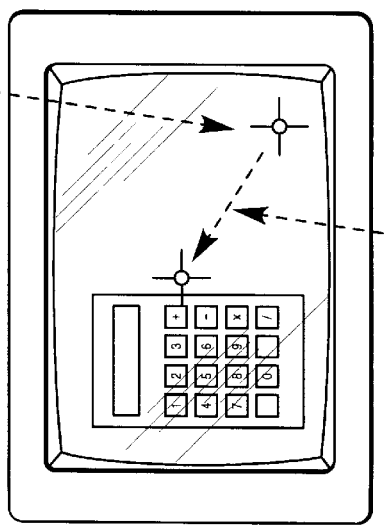
FIG. 3
MODE: ANNOTATION

FIG. 4
MODE: ANNOTATION
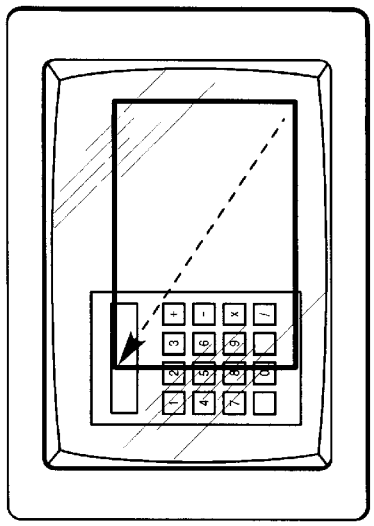
REMOTE
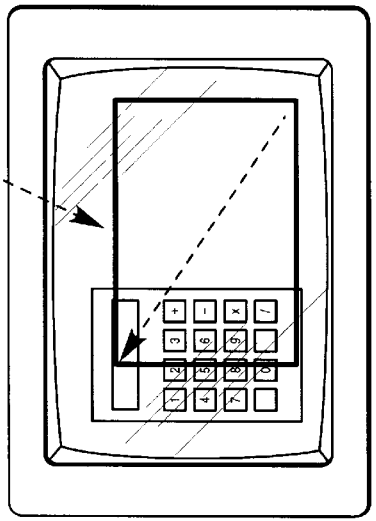
DRAWS BOX
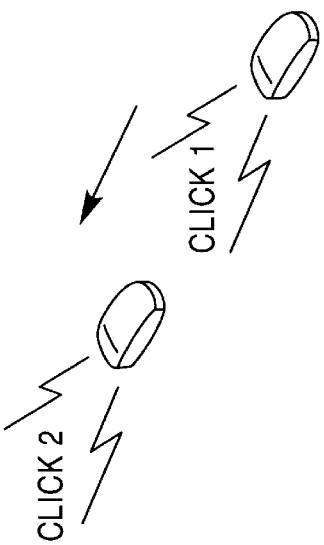
CLICK 1
CLICK 2
HOST
PROGRAM IS RUNNING HERE
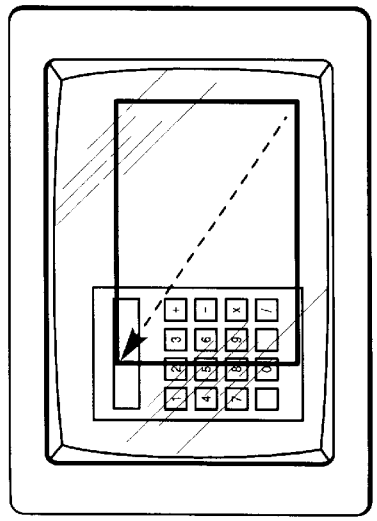
REMOTE

FIG. 6
MODE: LOCAL ANNOTATION
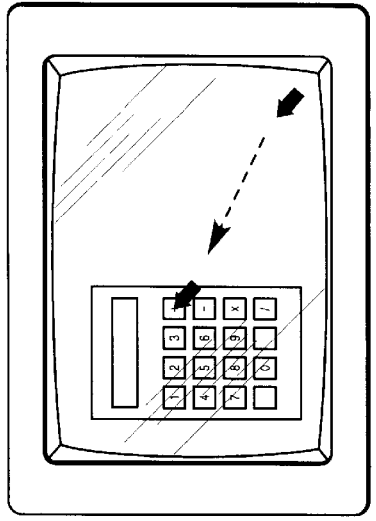
REMOTE
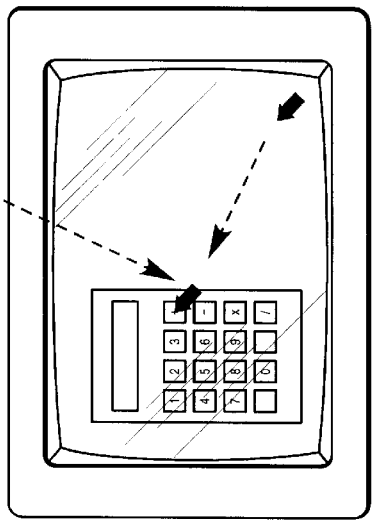
HOST
PROGRAM IS RUNNING HERE
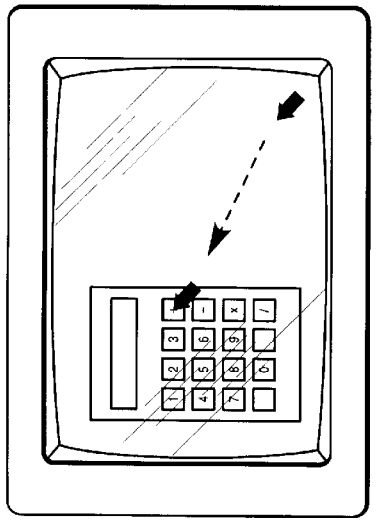
REMOTE

MODE: ANNOTATION

FIG. 11
MODE: APPLICATION
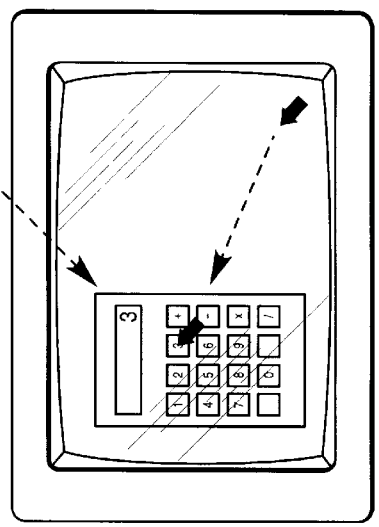
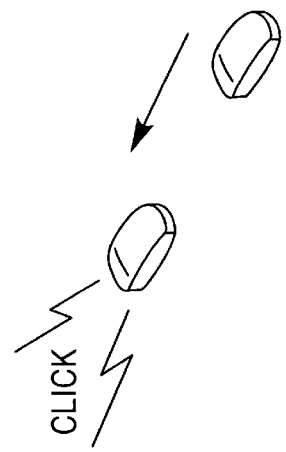
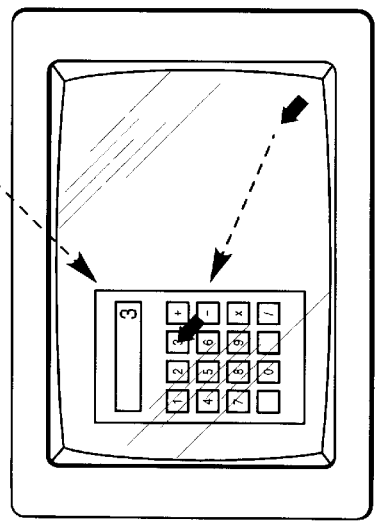
PROGRAM RUNNING ON HOST
BEHAVES AS THOUGH HOST CLICKED BUTTON
HOST SCREEN IS COPIED TO REMOTES
REMOTE
CLICK
HOST
PROGRAM IS RUNNING HERE
REMOTE

MODE: VIEW

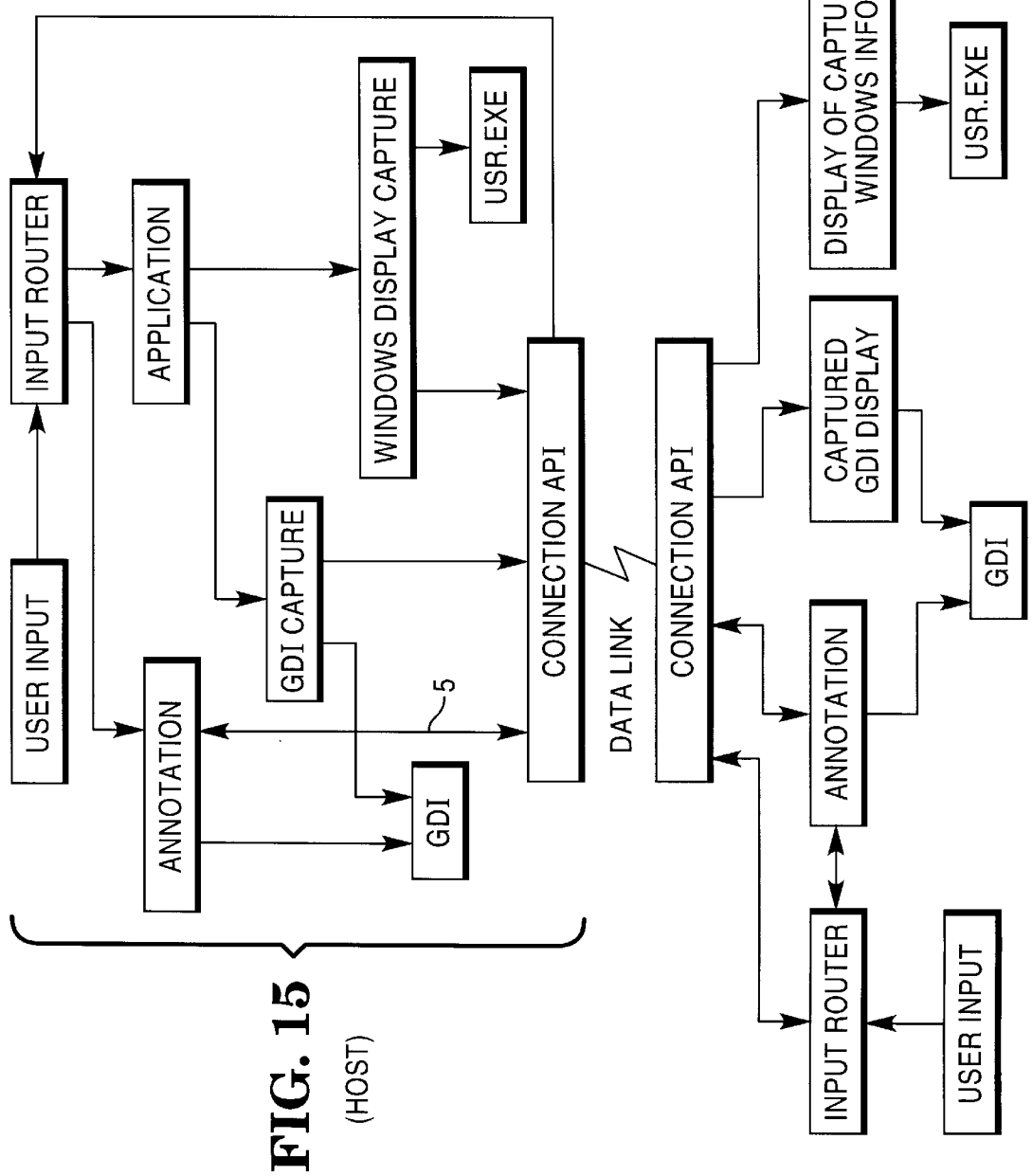

REMOTE COLLABORATION SYSTEM THAT STORES ANNOTATIONS TO THE IMAGE AT A SEPARATE LOCATION FROM THE IMAGE

CROSS-REFERENCE TO RELATED APPLICATIONS

This is a Divisional of application Ser. No. 08/033,602, filed Mar. 19, 1993, now abandoned which application is incorporated herein by reference.

This application is related to:

Application Ser. No. 08/035,092, now U.S. Pat. No. 5,649,104, entitled "Remote Collaboration System," filed on same date herewith by Carleton et al. and assigned to the assignee of this application;

Application Ser. No. 08/035,091, entitled "Remote Collaboration System," filed on same date herewith by Fitz-Patrick et al. and assigned to the assignee of this application; and Application Ser. No. 08/034,313, now U.S. Pat. No. 5,608,872, entitled "Remote Collaboration System," filed on same date herewith by Schwartz et al. and assigned to the assignee of this application.

The invention concerns systems which allow multiple users to remotely operate a single computer program. The invention generates a common visual image which is distributed to all computers. The users can make annotations on the common display. When they do, the invention replicates the annotations on all displays. Annotations can be kept private by users, if desired.

REFERENCE TO A MICROFICHE APPENDIX

A microfiche appendix, containing 2 microfiche and 142 total frames is filed herewith.

BACKGROUND OF THE INVENTION

Modern telephone systems allow multiple parties at different locations to hold a conference. However, telephone conferences do not provide all of the conveniences of a face-to-face conference, where participants all meet at a common table in a meeting room.

For example, in a meeting room, participants can view an object of interest, such as a drawing or a product. Such viewing is not possible in a telephone conference.

The invention provides a system which duplicates many of the conveniences of a conference where people are physically present, but allows them to be at remote locations.

OBJECTS OF THE INVENTION

It is an object of the invention to provide an improved electronic conferencing system.

It is a further object of the invention to provide a system which allows users to remotely operate a computer program.

It is a further object of the invention to provide a system which allows multiple computers to operate a single program residing on one of the computers.

It is a further object of the invention to provide a system which allows multiple computer users to view and annotate a common display.

SUMMARY OF THE INVENTION

In one form of the invention, multiple computers are linked together. One computer runs an application program. The invention allows a user of one of the other computers to control the program.

BRIEF DESCRIPTION OF THE DRAWINGS

FIG. 3 illustrates how the invention responds when a host user attempts to operate the calculator, when the invention is in Annotation mode.

FIG. 4 illustrates how the invention responds when a host user attempts to annotate the calculator, when the invention is in Annotation mode.

FIG. 6 illustrates how the invention responds when a host user attempts to operate the calculator, when the invention is in Local Annotation mode.

FIG. 11 illustrates how the invention responds when a remote user attempts to operate the calculator, when the invention is in Application mode.

FIGS. 15 and 15A illustrate logic flow used by the invention.

DETAILED DESCRIPTION OF THE INVENTION

Overview

Figure 1:
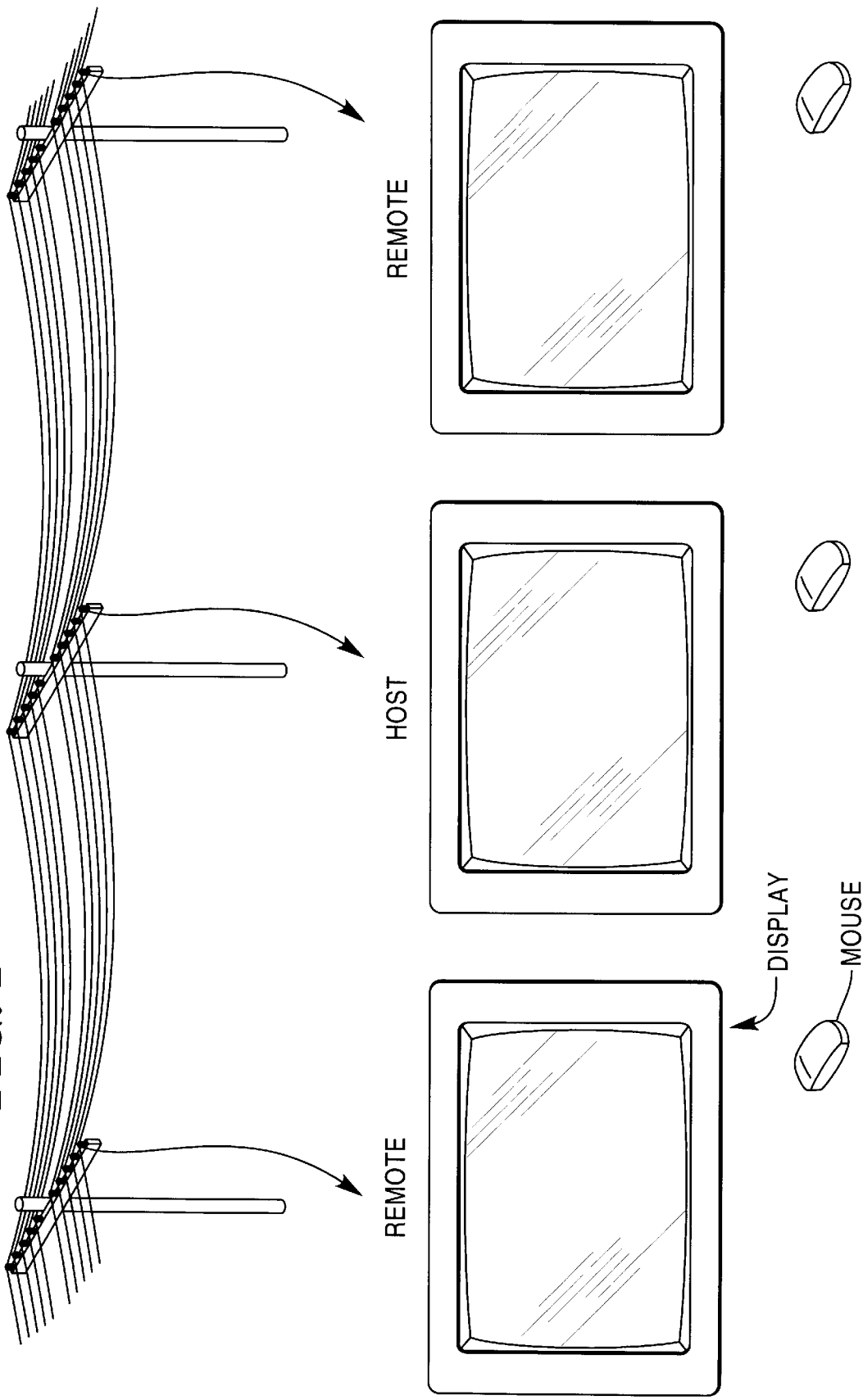
FIG. 1 illustrates three computers, connected by telephone lines.

FIG. 1 shows three computers connected by telephone links. Each computer runs a message-driven, multi-tasking, Graphical User Interface (GUI), such as that sold under the name Windows, available from Microsoft Corporation, located in Redmond, Wash. Such GUIs are also called operating environments.

The user of a GUI interacts with a program by way of windows. The invention replicates selected windows, rather than the entire display, at the remote computers. This selective replication allows users to maintain private areas on their displays, which are not shared.

Each computer also runs software developed by the inventors. In addition, one computer (the Host) runs an Application program. (It is possible for the Host to run both programs because of the multi-tasking capabilities of the GUI.)

The invention has four basic modes of operation:

1. Application Mode

Figure 2:
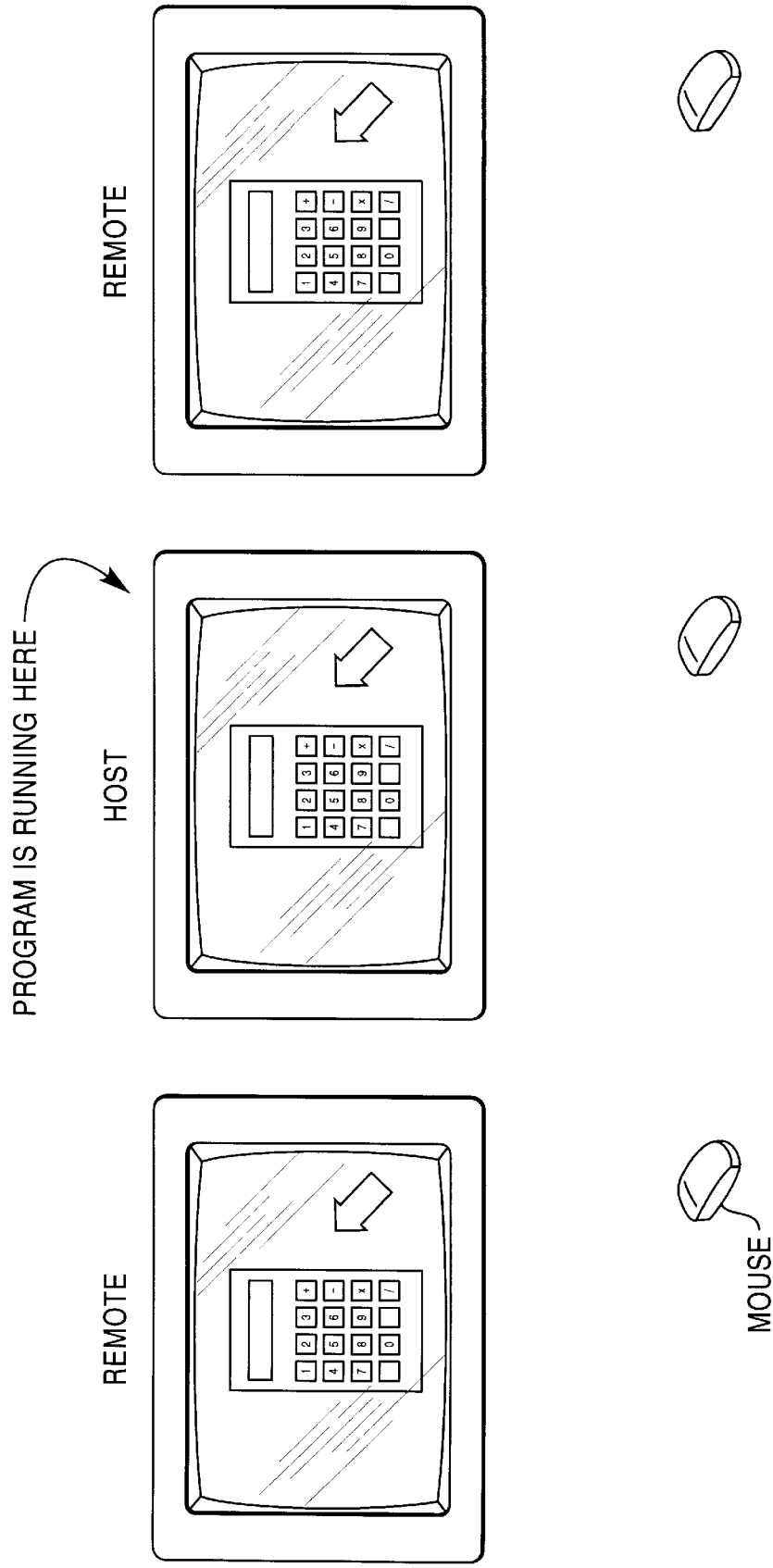
FIG. 2 initiates an example, which will be elaborated in FIGS. 3–14. In the example, a calculator program is operated, and annotated, by various parties.
Figure 5:
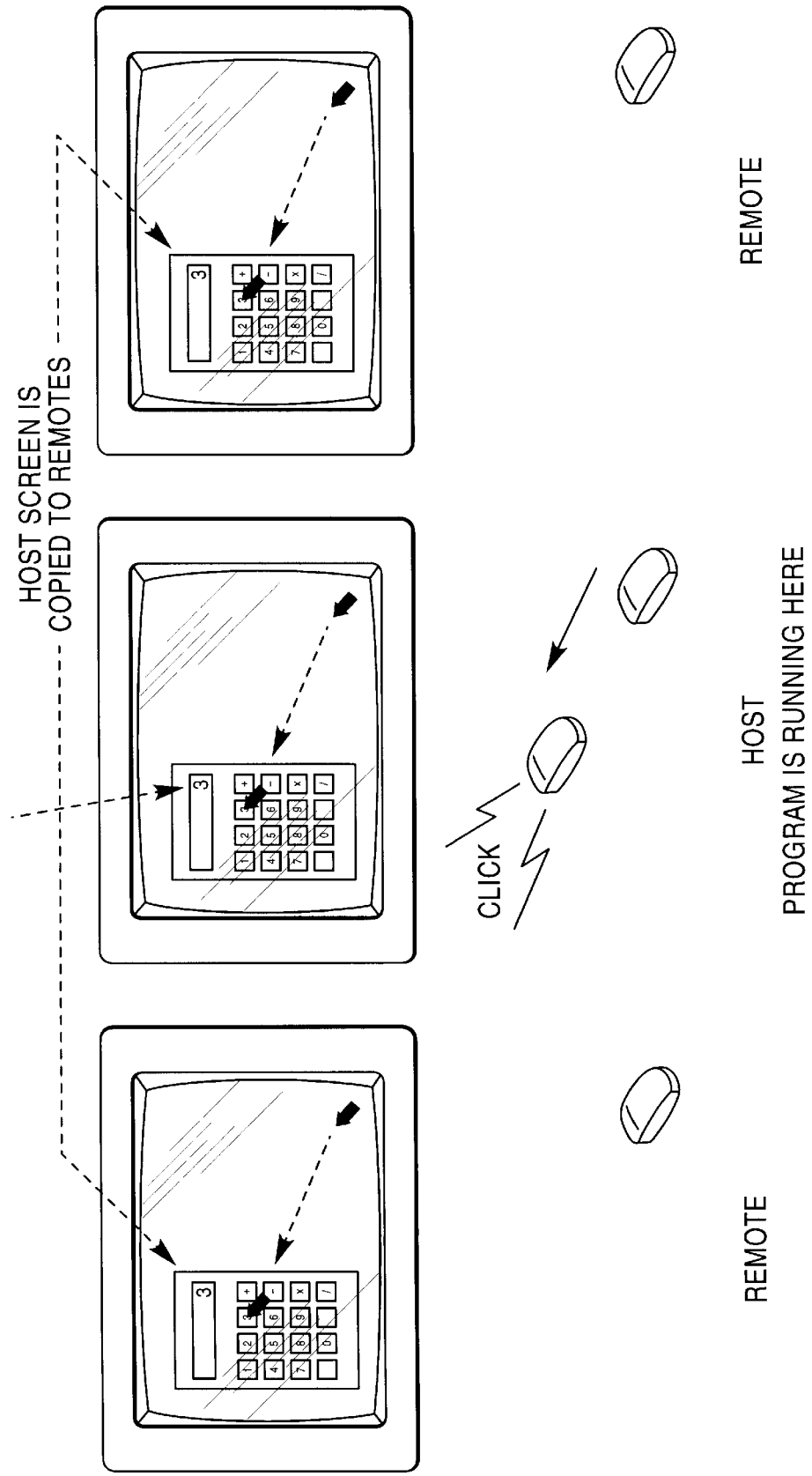
FIG. 5 illustrates how the invention responds when a host user attempts to operate the calculator, when the invention is in Application mode.

Any user of any of the three computers in FIG. 1 can issue commands to the Application program. For example, assume the Application program is one which simulates a hand-held calculator. The initial situation is shown in FIG. 2, where each computer display shows the calculator. Assume that the following events occur:

The user of the Host presses the "3" button on the calculator (either by keyboard input, or mouse input, depending upon the design of the calculator program). In response, each calculator, in its display area, shows a "3".

The user of one Remote presses "+".

The user of the other Remote presses "6".

The user of the Host presses "=".

At this point, all calculators will display "9", which is the sum of 3 and 6. The users collectively operated the calculator program, and the display of each shows the result.

The calculator program does not care which users pressed the buttons, nor whether some users pressed no buttons, provided a legal sequence of buttons was received. (It is assumed that the users are cooperative, and that no users try to sabotage operation of the calculator.)

2. Annotation bode

Any user can draw on the user's own, local, display, using drawing tools similar to those found in a "paint" program. The user can draw boxes, circles, arcs, text, ellipses, and so on. The user can also erase items on the display.

The invention can replicate the user's annotations on all other displays, so that all users view similar displays. However, the displays could be different, because of the following factors:

(A) Different display monitors have different properties, such as resolution and color capability.

(B) Different display protocols (EGA, VGA, etc.) represent graphics images differently, and have different color capabilities.

(C) Different GUIs, or different versions of the same GUI, may have different display conventions. Different computers in FIG. 1 could run the different GUIs.

(D) Some users have changed the size of the window in which their calculator is displayed, causing a deviation in scaling.

These differences can cause differences in the appearance of the displayed images, relative to each other, but the basic content of all displays should be the same. To accommodate size differences, the invention draws to different scales as appropriate.

3. Local Annotation Mode

A user can annotate the local display, but the annotations are kept private, and no other user can see the annotations.

4. View Mode

No users can annotate, nor can they issue commands. However, an action resembling annotation can be taken. Users can move their cursors, and others will see the movement, allowing remote pointing. View Mode is useful in one embodiment, wherein, for example, Annotate Mode is in force, but a specific user's mode is designated as View. In this embodiment, all users can annotate, but the "view" user can only watch, and cannot annotate.

Explanation of Individual Modes

FIGS. 3–14 will illustrate the different modes, by way of example, using the calculator program.

FIG. 3

Host Runs Application Program Mode is
"Annotation" User Input is at Host Computer User
Attempts to Operate Calculator Assume that the user of the host computer attempts to add two numbers, using the calculator. Attempted entry of the first number will be considered.

The user, located at the Host, moves the Host's cursor over a key of the calculator, as shown in FIG. 3, and tries to depress the key, by clicking the mouse. However, the mouse click does not reach the Application program, because the invention blocks it. The Application program does not respond, because it receives no mouse click.

That is, in more detail, the GUI detects the mouse movement, and causes "mouse messages" to be generated. The GUI places the mouse messages into a queue, where they await processing. INPUT ROUTER in FIG. 15 reads these messages. Because "Annotation Mode" is currently in force, INPUT ROUTER directs the messages to the ANNOTATION block. APPLICATION does not receive the messages, and thus does not respond. The mouse click is ignored.

Annotation's Response

ANNOTATION can be configured to respond in two (or more) ways to the mouse messages. In one configuration, ANNOTATION requires the mouse to initially select an ANNOTATION TOOL. If no selection is done, ANNOTATION ignores mouse messages.

Selection is done by clicking the mouse over an image of the tool, as is commonly done in "paint" programs. ANNOTATION recognizes this tool selection, and then treats subsequent mouse clicks as data for drawing with the selected tool. For example, if a rectangle tool were selected, the next two mouse clicks would define the diagonal corners of the rectangle. (FIG. 4, later discussed, illustrates drawing a rectangle.)

Under the second configuration, a default tool, such as a pen, is automatically selected when in Annotation Mode. In this configuration, when the user tries to depress a calculator button (by clicking on it), the user (unintentionally) initiates drawing of a line, using the pen. When the user recognizes this, the user can terminate drawing of the line, in any of several known ways.

Therefore, in Annotation Mode, the invention either (a) responds to mouse input by initiating a default annotation, or (b) ignores the mouse input, because an annotation tool was not selected. Keyboard input from the user is treated the same way. Of course, other responses by ANNOTATION can be designed.

Tracking of Cursors

Each display shows a cursor whose position is controlled by the associated mouse. The invention replicates each cursor on all displays. Thus, in FIG. 3, with three mouses, there are three cursors on each display (only one is shown for simplicity).

Consequently, when one user moves a mouse, the corresponding cursor moves on all displays.

In general, the three cursors are distinguishable: each cursor identifies its owner, as by color, shape, inclusion of a label, or the like.

FIG. 4

Host Runs Application Program Mode is
"Annotation" User Input is at Host Computer User
Attempts to Draw a Box Over the Calculator This situation is quite similar to that of FIG. 3, except that, now, the user intends to draw an annotation, instead of intending to press a button, as in FIG. 3.

Assume that the user of the host computer draws a box over the calculator. (The box is shown overly large, for emphasis. It is preferred that the box not extend beyond the calculator itself.) The invention replicates the box on the remote computers. (The box is drawn using annotation tools, which are not shown.)

In terms of FIG. 15, INPUT ROUTER directs the logic flow to ANNOTATION. ANNOTATION calls the proper GDI functions to draw the box. Also, ANNOTATION sends "annotation messages" to CONNECTION API, which delivers the annotation messages to the Remotes.

ANNOTATION in FIG. 15A receives the annotation messages. This ANNOTATION block represents the logic executed at each remote computer. This ANNOTATION calls the proper GDI functions, via the block GDI.

"GDI" is an acronym for Graphical Device Interface. "GDI functions" are small programs, contained in a larger program of the GUI called GDI.EXE. A GDI function, when called, draws a specific graphic image, such as a circle, box, or text, based on subsequent input from the user. Other GDI functions perform other tasks, such as selecting pen widths.

GDI.EXE is a commercially available product. Technical details concerning GDI.EXE are contained in "Windows Software Development Kit," available from Microsoft Corporation, and in Programming Windows 3.1 by Charles Petzold (Microsoft Press, Redmond, Wash., 1992, ISBN 1-55615-395-3).

FIG. 5

Host Runs Application Program Mode is "Application" User Input is at Host Computer User Attempts to Use Calculator The user of the Host moves the cursor over the calculator key "3" and clicks the mouse. The GUI generates a mouse message and places in into the queue. The invention reads the mouse message, and passes the message to the Application program (ie, the calculator program), which responds by (1) showing that the key "3" is depressed and (2) drawing the numeral "3" in the calculator's display, using GDI calls. The Application program also records the fact that the user enters a "3," for its own internal operations.

The invention also intercepts the GDI calls made by the Application program in drawing the "3" in the calculator, and in drawing the depressed "3" button. The invention notifies the other computers of the GDI calls. The other computers replicate the Host display, by executing the same GDI functions. Greater detail concerning this GDI interception is given later, in the section entitled "General Considerations."

Thus, all users simultaneously see the user of the Host operate the calculator. (The action is not exactly simultaneous, because extremely short delays are involved. However, a human probably could not detect the delays if the Host and the Remote were operating side-by-side.)

In terms of FIG. 15, the INPUT ROUTER recognizes that the mouse messages should be directed to the Application program, and directs the logic flow to APPLICATION (ie, the calculator program). APPLICATION (1) draws a depressed "3" key and (2) writes the numeral "3" in the calculator's display, by calling appropriate GDI functions.

However, the invention, via GDI CAPTURE in FIG. 15, captures the Application program's GDI calls, before they are executed. The invention does two things with the captured calls. One, it notifies the other computers of these calls, via the block CONNECTION API. This action leads to block CAPTURED GDI DISPLAY in FIG. 15A, which causes each Remote to execute the same GDI functions, as indicated by block GDI.

Two, the invention allows the GDI functions, called by the Application program, to be executed at the host, via the block GDI in FIG. 15.

Therefore, the invention captures GDI function calls made by the Application Program. The invention notifies the Remote computers of the captured calls, so that the Remotes can duplicate them. The invention allows the captured calls to be executed as intended on the Host.

FIG. 6

Host Runs Application Program Mode is "Local Annotation" User Input is at Host Computer User Attempts to Operate Calculator Assume that in Annotation Mode, there is no default annotation tool given to the user. Under this assumption, if the user moves the cursor to a calculator button, and tries to "press" the button, the INPUT ROUTER in FIG. 15 passes the mouse message to the ANNOTATION block. Since the mouse click is not part of a valid annotation input sequence (no tool was selected), ANNOTATION draws nothing.

Further, the Remote computers do not show the movement of the cursor corresponding to the Host computer's mouse, as indicated, because line 5 in FIG. 15 does not send Annotation Messages to the other computers when Local Annotation is in force.

Further still, the calculator button is not re-drawn as a depressed button on the Host display, in response to the attempt to press it, because APPLICATION did not receive the mouse message. APPLICATION is responsible for drawing depressed calculator buttons.

If a default annotation is assigned to the user in Local Annotation Mode, the user's mouse click would initiate drawing by that tool. When the user realized the mistake, the user would terminate the drawing, in a known manner.

FIG. 7

Host Runs Application Program Mode is "Local Annotation" User Input is at Host Computer User Attempts to Annotate Calculator Under these conditions, the INPUT ROUTER in FIG. 15 recognizes a valid attempt to perform annotation, as by drawing a box. The INPUT ROUTER directs the logic flow to the ANNOTATION block, which calls the proper GDI functions for drawing the annotation, namely, a box, as shown in FIG. 7.

Figure 7:
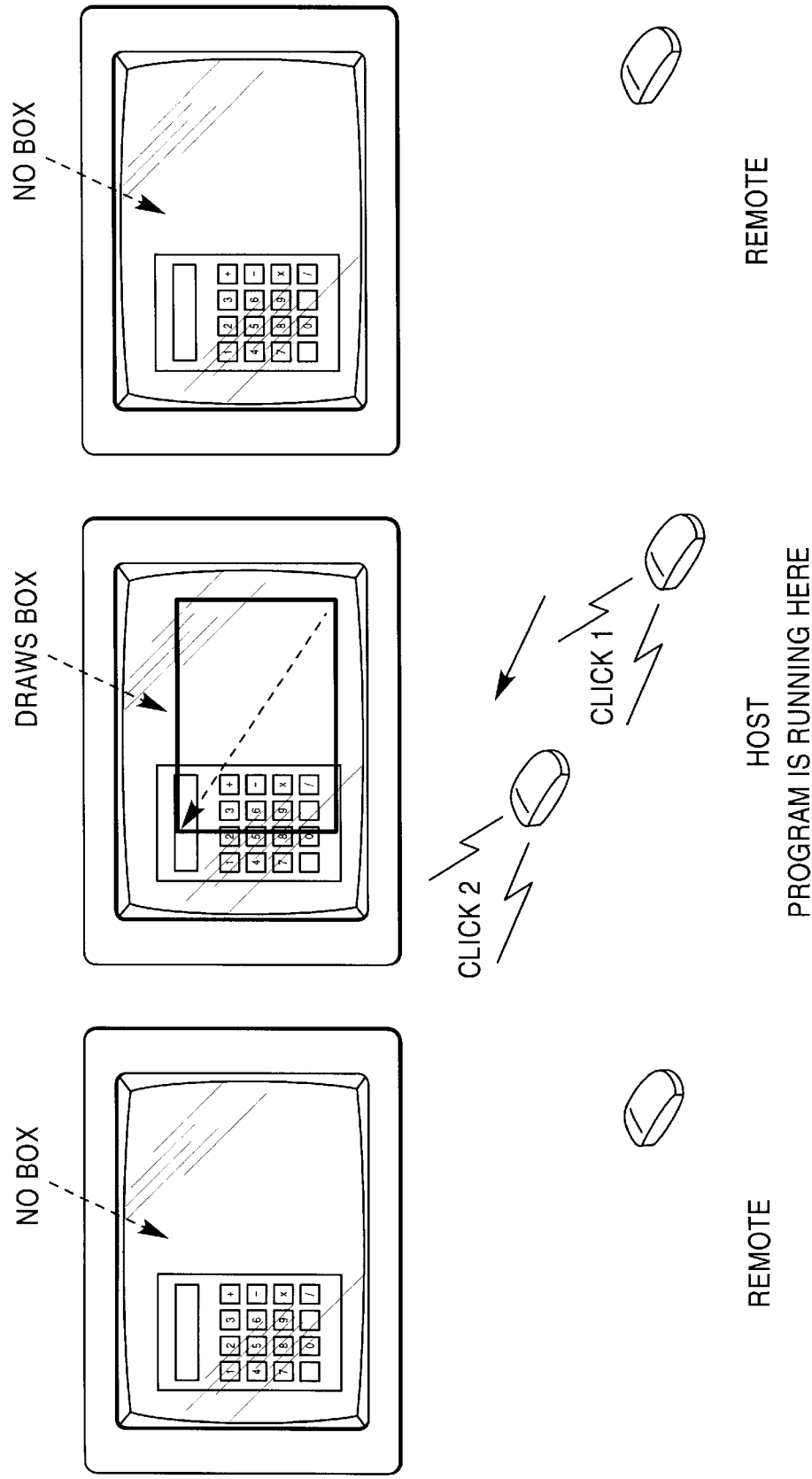
FIG. 7 illustrates how the invention responds when a host user attempts to annotate the calculator, when the invention is in Local Annotation mode.

However, because the annotation is local, no boxes are drawn on remote computers, as indicated in FIG. 7. No data is sent along data path 5 in FIG. 15.

FIG. 8

Figure 8:
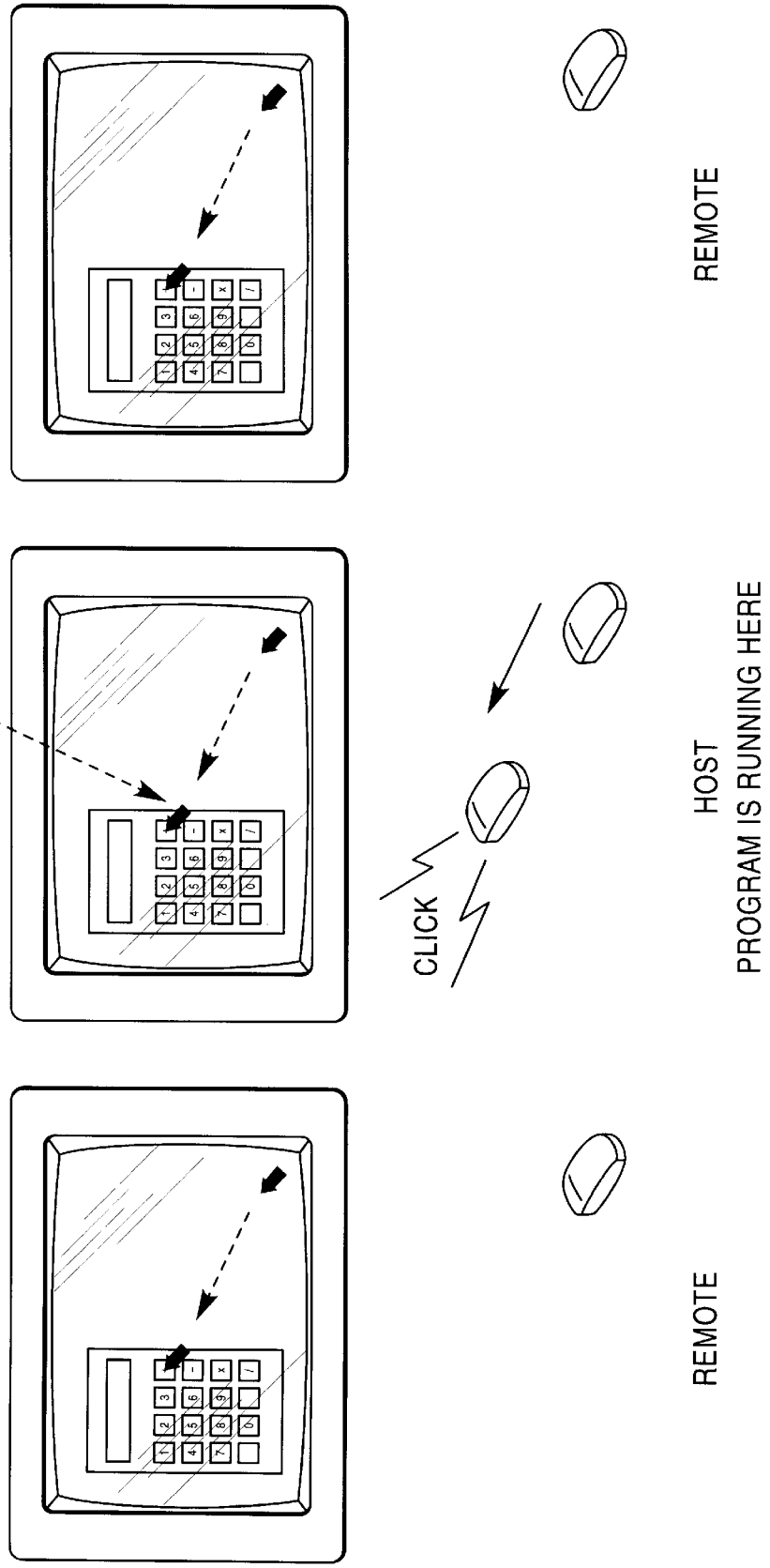
FIG. 8 illustrates how the invention responds to a host user when in View mode.
Figure 9:
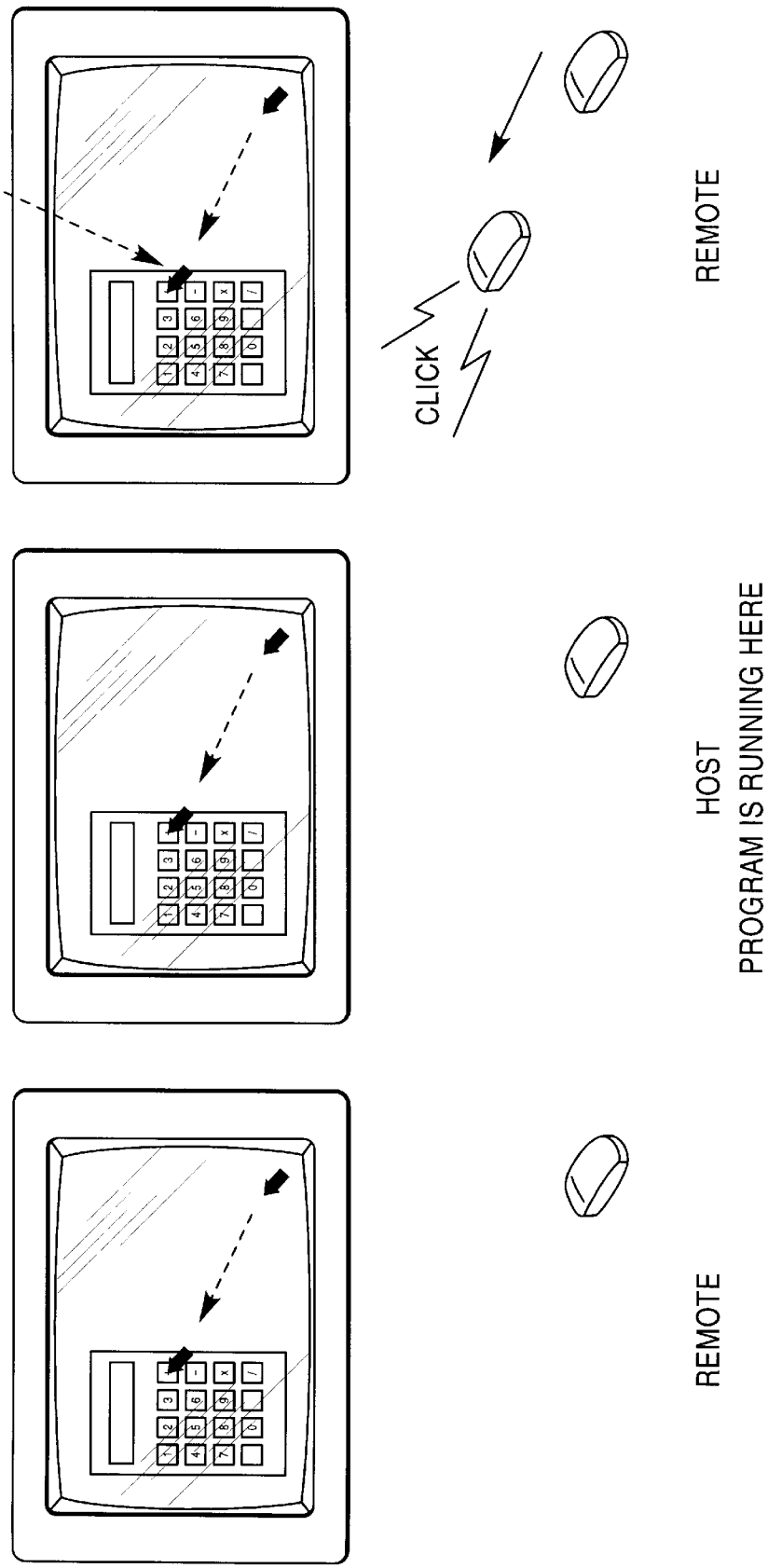
FIG. 9 illustrates how the invention responds when a remote user attempts to operate the calculator, when the invention is in Annotation mode.
Figure 10:
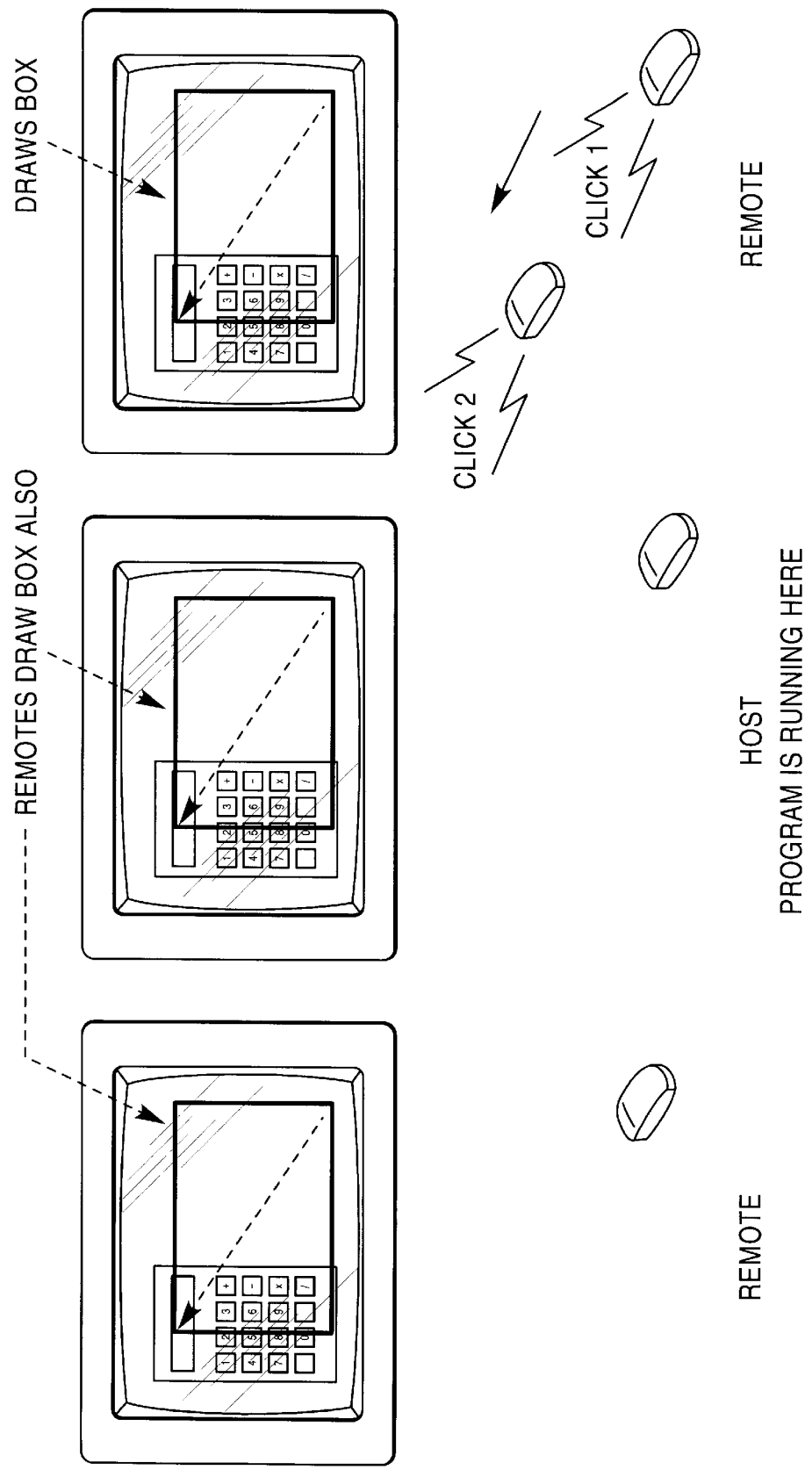
FIG. 10 illustrates how the invention responds when a remote user attempts to annotate the calculator, when the invention is in Annotation mode.
Figure 12:
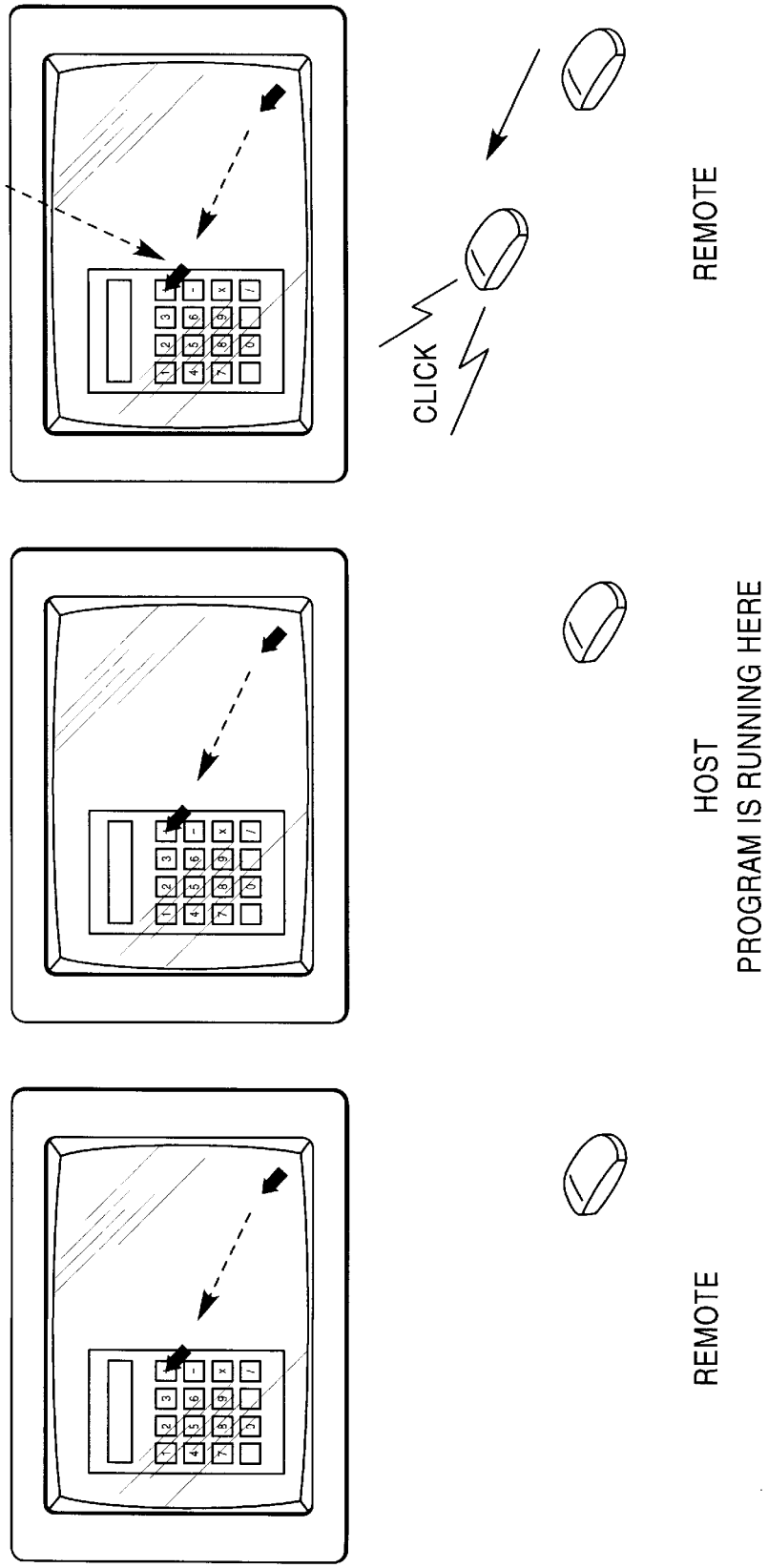
FIG. 12 illustrates how the invention responds when a remote user attempts to operate the calculator, when the invention is in Local Annotation mode.
Figure 13:
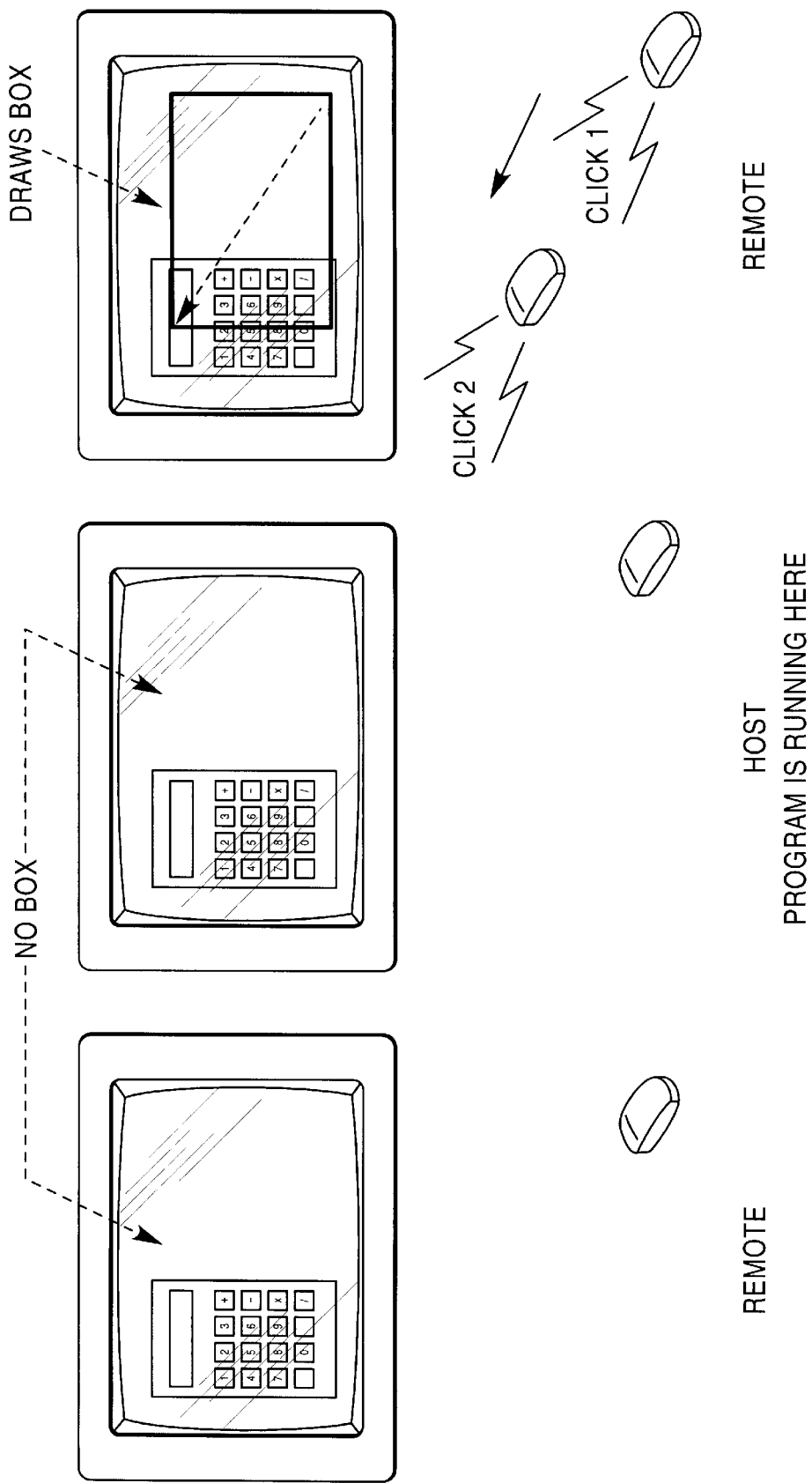
FIG. 13 illustrates how the invention responds when a remote user attempts to annotate the calculator, when the invention is in Local Annotation mode.
Figure 14:
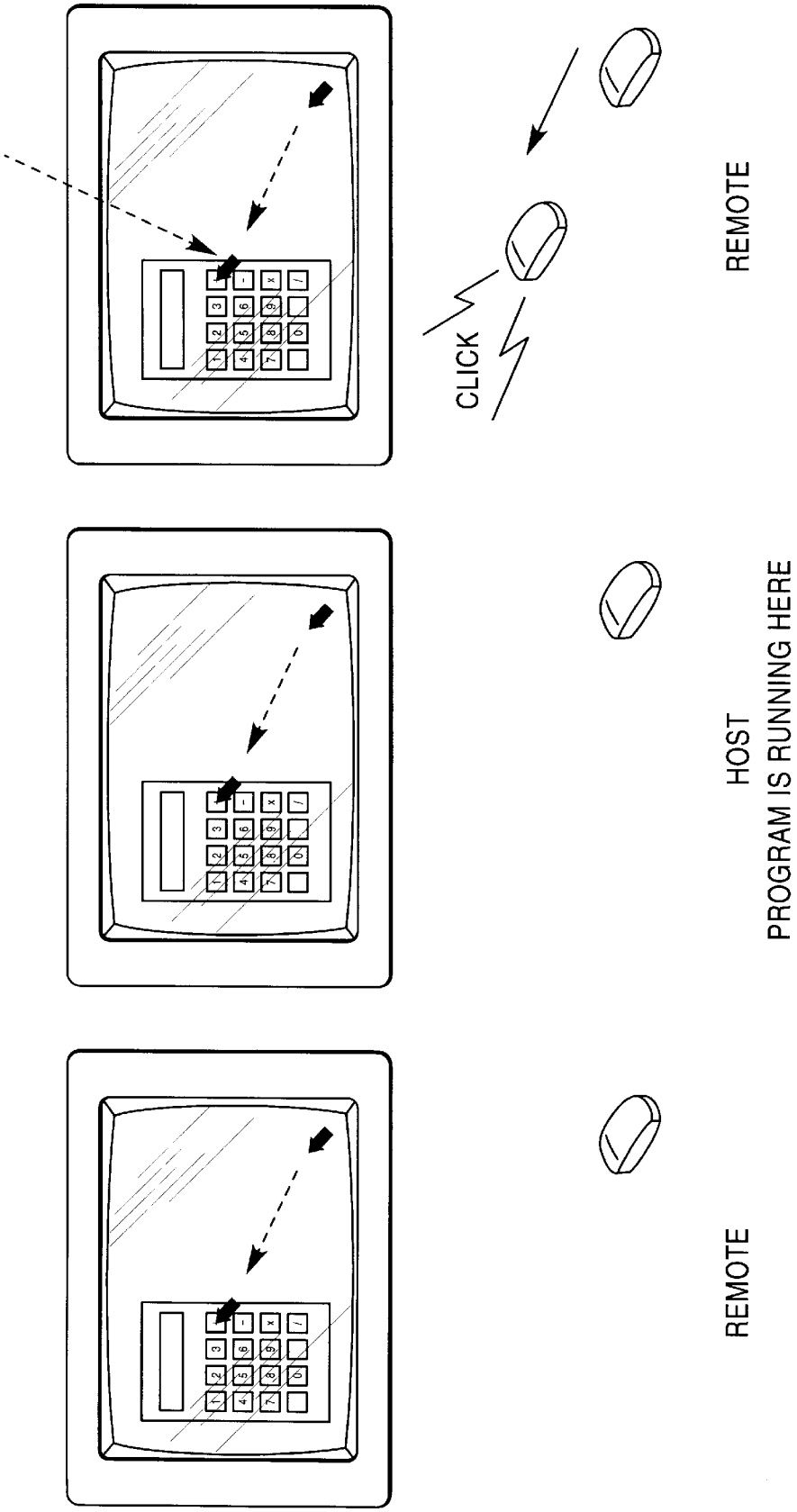
FIG. 14 illustrates how the invention responds to a remote user when in View mode.

Host Runs Application Program Mode is "View" User Input is at Host Computer User Attempts to Operate Calculator As FIG. 8 indicates, the mouse click is ignored, and nothing happens at the Remotes.

In FIG. 15, the INPUT ROUTER reads the mouse message, but blocks it from APPLICATION, because the current mode is "view."

FIG. 9

Host Runs Application Program Mode is "ANNOTATION" User Input is at Remote Computer User Attempts to Operate Calculator Assume that the user moves the mouse cursor over a calculator button and clicks the mouse. The mouse click is ignored. The other computers (Host and the other Remote) show the motion of the user's cursor, but nothing else, because no tool has been selected.

In FIG. 15A, the INPUT ROUTER blocks the mouse message from reaching APPLICATION. The logic is directed to ANNOTATION, which draws a cursor on the user's Remote display, via block GDI. ANNOTATION also sends data to CONNECTION API, which directs the logic to ANNOTATION in FIG. 15. This ANNOTATION represents the annotation logic present on the two other computers: the Host and the other Remote. These ANNOTATION blocks draw cursors corresponding to the users cursor, at corresponding positions, via the GDI block in FIG. 15, which represents GDI function calls.

The Host can use one tool, such as a box-drawing tool, while a Remote can use a different tool, such as a circle-drawing tool.

FIG. 10

Host Runs Application Program Mode is "ANNOTATION" User Input is at Remote Computer User Attempts to Annotate Calculator Assume that the annotation is a box. A box is drawn on all displays. In FIG. 15A, the INPUT ROUTER at the user's Remote directs the mouse messages to the block ANNOTATION. ANNOTATION does two things. One, it calls the proper GDI functions to perform the annotation, namely, drawing the box.

Two, ANNOTATION sends annotation messages to CONNECTION API, which delivers the annotation messages to the other computers. However, one of these is the Host, and the other is a Remote. The logic at the Host reaches ANNOTATION in FIG. 15, and the logic at the other Remote reaches ANNOTATION in FIG. 15A.

Both of these ANNOTATION blocks cause the proper GDI functions to be called, to draw an annotation corresponding to the user's annotation. However, in the Host, logic path 5 is not taken at this time, because it is not necessary to replicate the Host's annotations at other computers.

FIG. 11

Host Runs Application Program Mode is "APPLICATION" User Input is at Remote Computer User Attempts to Operate Calculator The reader is reminded that the calculator program is loaded only on the host, while a Remote user wishes to operate it.

The Remote user's INPUT ROUTER in FIG. 15A routes the mouse messages to CONNECTION API. The Host receives these messages, which are delivered to the Host's INPUT ROUTER in FIG. 15. The Host's INPUT ROUTER directs the messages to the block APPLICATION (ie, to the Application program, namely, the calculator program), which does two important things.

The calculator program treats the messages as though they were issued by the Host's mouse, even though a Remote mouse caused them. The calculator program responds in its usual way, which includes (1) showing a depressed calculator button "3", (2) writing the numeral "3" in the calculator's display, and (3) performing its own internal computations when it learns that the user entered data (namely, the "3").

However, before the calculator program can execute (1) and (2) in the previous paragraph, the Invention first captures the GDI functions which the calculator program calls. This capture is illustrated in block GDI CAPTURE in FIG. 15.

During this capture, the Invention, in effect, does two things. One, it sends these GDI functions to CONNECTION API (for the other computers to use). At the user's Remote, CONNECTION API in FIG. 15A directs the GDI functions to CAPTURED GDI DISPLAY, which replicates the Host's display. Two, it causes the GDI functions to be executed at the Host (via block GDI in FIG. 15). Therefore, the general sequence of events is the following:

The Remote user attempts to press a calculator button.

The invention running on the Remote detects this attempt, and sends data to the calculator program running on the host. The data takes the form of messages, which the calculator program "thinks" come from the Host's mouse.

The calculator program performs as usual, and draws images on the Host display, via GDI calls.

The invention captures the GDI calls, and informs the Remotes of them.

The Remotes replicate the Host's window. The Remote user thus can remotely operate the calculator program running on the Host.

Summarizing in a different way: The invention generates mouse messages at the Host, based on mouse messages at the Remote. The calculator program (running on the Host) responds to the mouse messages as though they were generated at the Host. The invention intercepts the GDI calls made by the calculator program, and executes the same GDI calls at the Remote, thereby replicating the Host's display at the Remote.

FIG. 12

Host Runs Application Program Mode is "Local Annotation" User Input is at Remote Computer User Attempts to Operate Calculator The user's mouse click is ignored. Nothing appears on the other displays in response to the mouse movement, because of failure to select a tool.

FIG. 13

Host Runs Application Program Mode is "Local Annotation" User Input is at Remote Computer User Attempts to Annotate Calculator The annotation is drawn on the user's display, as indicated. No annotation occurs on the other displays.

FIG. 14

Host Runs Application Program Mode is "View" User Input is at Remote Computer User Attempts to Operate Calculator As indicated, the mouse cursor moves at the user's display, but the mouse click is ignored. Further, the other two displays do not show the movement of the user's mouse cursor.

General Considerations

1. Different Programs Draw Different Parts of overall Display. The displays are drawn using GDI functions. However, different parts of a display are drawn by different programs.

Despite the fact that all these drawing operations are undertaken using GDI functions, GDI functions are not the exclusive medium of communication between computers for replicating the displays.

Annotation Involves One Type of Data Transfer Among Computers

Drawing by an Application Program Involves Another Type

For example, when a user performs annotation, the user's mouse messages are replicated, AS MESSAGES, at the other computers, via path 5 in FIG. 15. These replicated messages then cause the respective ANNOTATION blocks (at the other computers) to issue the proper GDI calls for drawing the annotation. That is, GDI calls are not sent directly from the user performing the annotation to the other computers.

In contrast, when an application program causes a graphic image to be drawn on a display, the invention intercepts GDI calls (via GDI CAPTURE in FIG. 15) and causes the GDI calls to be replicated on the other computers.

Reason for Difference

A major reason for the two different procedures (replicating mouse messages and replicating GDI calls) is that annotations are stored in memory at different locations than the display information.

That is, returning to the calculator of FIG. 2, the Application program stores the image of the calculator in the following general way. Annotation data is stored by the invention; Application program data is stored by the Application program (at the host). Each image of a key is stored as data from which a GDI function can draw the key. The data includes information such as position, size, color, and so on. Each key includes an associated number. The number can be stored as a text character, with information as to position, size, font type, and so on.

Annotation data is stored at a different location, but in the same general way.

If either the annotation or the Application program needs bitmaps, the bitmaps are stored in a conventional, known manner, by the GUI.

The invention combines the annotation images with the Application's images by the known technique of masking. That is, the invention, at a Remote, plays (or executes) the received GDI functions into a bitmap. The invention plays the received annotation information into a different bitmap. The two bitmaps are masked together.

The annotation data is kept separate from the application data so that, for example, a user can save an Application image, but without annotations. Alternately, a user can save annotation data alone, or save an annotated display.

As another example, keeping the annotation data separate facilitates drawing a display having no annotation data. If the annotation data were intermingled with the calculator image data, elimination of the annotation data would be difficult, if not impossible.

If GDI calls were transmitted exclusively (ie, no message replication were undertaken), then extra effort would be required to construct annotation data for separate storage.

2. GDI Interception, or Capture. GDI interception can be understood as follows.

A. On start-up, the invention replaces the first five bytes of each GDI function with a JUMP instruction to a particular program, namely, Trap.GDI.

B. Trap.GDI gets the parameters for the desired graphics image (eg, in the case of a box, the locations of the two diagonal corners) and calls the sub-program PkgDisp-Call. Trap.GDI also replaces the first five bytes.

C. PkgDispCall accepts the parameters from Trap.GDI and generates an object structure. This object structure is a block of data containing everything necessary for the other computers to draw the box.

For example, the object structure contains information as to size and position of the box. Further, the GUI draws images within a "context." The context includes things such as pen width, color, and other features. The invention tracks the contexts of the individual computers. If the context of the box drawn is different from the contexts of the remote computers, PkgDispCall includes data necessary for the other computers to create the correct contexts.

D. The object structure is shipped to the other computers, which then execute the same GDI functions.

E. The invention executes the original GDI functions.

3. Displays are not Transferred in Entirety. The displays are not replicated bit-by-bit. For example, the image of the calculator in FIG. 2 could be transferred between computers in bitwise fashion. If the calculator occupied a space of 200×300 pixels, then information regarding 60,000 (ie, 200×300) pixels must be sent.

Instead, the particular calculator image shown in FIG. 2 is treated as eighteen rectangles, plus a text character for each of sixteen of the rectangles, giving a total of 34 objects. Each object requires parameters, such as size and position. The number of parameters is small, in the range of three to ten. Assuming ten parameters, then 340 pieces of data must be sent. Of course, the size of each piece depends on many factors, but a small number of bytes for each piece may be assumed.

Therefore, the invention reduces the 60,000 pieces of data needed for bitwise replication to 340 pieces maximum for object replication. Of course, some objects may take the form of bitmaps, and must be sent bit-by-bit. However, in general, bitmaps are expected to be rare. Further, it is expected that, in general, bitmaps, when sent, need be send only once.

Further, the object data is compressed when possible. That is, every transmission between computers is of compressed data, when possible. Compression is known in the art.

4. Types of Data Link. Communication among computers can take several forms. Commercially available networks, local and wide area, can be used. Commercially available ISDN telephone service, provided by local telephone companies, can be used. Modem communication can be used.

5. Prior Art Message Detection. There are commercially available packages which detect messages generated by the GUI in response to an input device. One such package is WINSIGHT, available from Borland International. However, it is believed that such packages do not inform remote computers of the messages.

6. Alternate GDI Capture. An alternate approach to the graphics capture described above is the following. The system-provided GDI is replaced by a separate procedure which processes GDI calls before calling the actual system GDI. The system GDI name is changed to prevent confusion between the two modules. The same technique is also used on USR.EXE to also capture GDI calls made through system-provided modules.

7. More than one Computer can Run Application Programs. A given computer can act as a Host for one program and a Remote for another. For example, one computer can run a word processing program. Another computer can run a CAD drawing program. Each is Host for its respective program.

Since the invention's software on each computer is identical, or substantially identical, all users can run either the word processing program or the CAD program, in the manner described above.

8. "Real" Cursors and "Pseudo" Cursors. There are two types of "cursor." Each GUI generates its own "real" cursor. The real cursor is not generated by GDI functions, but by an independent function in the GUI. The reader can view the cursor as a bitmap which the GUI moves in response to mouse motion.

In addition to the real cursor, which is controlled by the local mouse, the invention generates a "pseudo" cursor for each remote participant. The pseudo cursors are generated using GDI functions.

Sometimes a real cursor changes shape as the cursor moves. For example, it can take the form of an arrow when lying on a tool bar, and then change to a hand when lying on a client area. Sometimes this change is under the control of the Application program.

Therefore, if a Remote user is controlling an Application program running on a Host machine (as in FIG. 11), the Application program may change the cursor on the Host machine, but without using GDI calls. Consequently, the GDI capture of FIGS. 15 and 15A will be ineffective to replicate the changed on the Remote display.

To confront this problem, the invention watches for the functions which change the real cursor (eg, the SetCursor command). The invention replicates the cursor change on the Remote computer.

One way is to execute the same SetCursor command. An alternate approach would be to change the Remote cursor by executing a proper sequence of GDI calls, or to draw a bitmap, when the Host cursor changes.

9. Entire Display not Replicated. The invention only replicates windows which the user of a display identifies. That is, the user can keep a workspace, such as a notepad, private during a conference. GDI calls use a task handle. If the task handle does not refer to a shared item, the GDI calls are not shared.

10. Computer Code. Computer code in microfiche form is attached. A description of files contained therein is contained in the following Table.

TABLE (See the end of tgapp.c for a description of how invention starts up, and the order in which things are intialized.)

about.c

Relates to About Dialog Box.
about.h

Goes with about.c.
annot.h

Contains named identifiers for Annotation Messages.
Contains Limits on the maximum number of machines that may share, and the maximum number of Applications they may jointly share.

TABLE-continued (See the end of tgapp.c for a description of how invention starts up, and the order in which things are intialized.)

Contains defintions of structures that hold data for Annotation Messages and information about Shared Applications.
Contains some prototypes of functions from sautil.cpp and draw.cpp
anntb.c Contains code which operates the Annotation ToolBar.
antb.h Contains named identifiers for parts of Annotation ToolBar and a few function prototypes for anntb.c.
annvid.c Contains functions relating to when video is placed in the annotations toolbar.
annvid.h Contains named identifiers for annvid.c.
audio.c Contains a function to update the Audio Button.
audio.h Contains function prototypes for audio.c.
bitmapop.h Contains function prototypes for all sorts of routines to do all sorts of things to BitMaps.
cache.c Relates to interception and caching CreateDC.
dirutil.c Contains functions to support an ISDN audio/video phone directory.
dirutil.h Contains named identifiers and function prototypes for dirutil.c.
disp.c Contains a list of GDI functions to intercept and the Package functions to which they correspond.
Contains functions to install and remove the changes to GDI required to do the intercepting.
Contains a function to look up the Package function corresponding to the intercepted functions.
Contains the Package functions themselves including a couple that don't correspond to GDI intercepts, and one which corresponds to the WinExec function of the USER module, which is also intercepted.
draw.cpp Contains functions to manipulate, save, and restore the Bitmaps which represent Application Windows and Annotation Windows.
Contains functions to Compose the Annotations over the Screen image.
Contains functions to update the User's Annotation Tool choices and update them on the Remote PCs as well.
Contains functions to actually do the drawing on the Annotation Bitmaps (including drawing text).
Contains functions to Package and send arbitrary data to Remote Users.
editdir.c Contains functions for editing the entries in the ISDN phone directory maintained in dirutil.c.
editdir.h Contains named identifiers and function prototypes for editdir.c.
edmnu.h Contains named identifiers for the Menu used by editdir.c.

TABLE-continued (See the end of tgapp.c for a description of how invention starts up, and the order in which things are intialized.)

filetrns.c

Contains functions to support File Transfer over TeleMedia, which handles communication among computers.
filetrns.h Contains named identifers and function prototypes for filetrns.c.
fsm.h Contains named identifiers and function prototypes to support the Phone Client Finite State Machine.
ftmnu.h Contains named identifiers for the File Transfer Menu.
ftprog.c Contains functions to support the File Transfer Progress Dialog Box.
ftprog.h Contains named identifiers and function prototypes for ftprog.c.
ftset.c Contains functions to support the File Transfer Settings Dialog Box.
ftset.h Contains named identifiers and function prototypes for ftset.c.
bdiobj.h Contains definitions of structures to hold information about GDI objects, notably size information.
gdiobjcp.c Contains functions to collect the parts of GDI objects into one place and determine the size of the result.
gdiobjpy.c Contains functions to produce actual GDI objects in memory from their packaged descriptions, and return Handles to those objects.
Contains some functions which do maintenance of DC's (Device Contexts) in relation to the creation of other GDI objects.
gdiobjpy.h Declarations of functions in gdiobjpy.c.
globals.c Contains declarations of some variables related to GDI capture and Message capture.
Contains extern declarations of the others.
globals.h Extern declarations of the variables in globals.c.
iconapp.c Contains functions for creating and manipulating Icons.
iconapp.h Contains named identifiers and function prototypes for iconapp.h.
iconwin.c This contains a Window Procedure for a Dialog Box related to Icons.
incoming.c Contains functions to support Incoming Call Dialog Box.
incoming.h Contains named identifiers and function prototypes for incoming.c.

TABLE-continued (See the end of tgapp.c for a description of how invention starts up, and the order in which things are intialized.)

inputrtr.cpp

Contains structures concerning cursors.
Contains functions to initialize Input Router Library.
Contains functions for intercepting Messages.
Contains functions for simulating Mouse and Key events.
Contains Window Procedures for the Input Router and the Shared Application Window (which echoes the real Application's appearance).
Contains functions to handle Annotation Messages, and User Input Messages destined for a Remote Application.
Contains functions to translate coordinates from the Host to Remote.
intercpt.asm Contains TRAPGDI and TRAPCACHE which handle identifying the address of the call which was intercepted and which Package function we want to call as a result of that.
isdnapp.c Contains functions to support ISDN calls, though most are stubs at this point.
line.c Contains functions to support a Dialog Box for Selecting Line characterisitics.
line.h Contains named identifiers and function prototypes for line.c.
linklist.c Maintain linked lists of information structures for intercepted calls and tasks corresponding to the Applications we are sharing.
msc_ctrl.h Contains named indentifiers and function prototypes related to MCS Control.
newdir.c A Window Procedure for a Dialog Box. The identifiers in newdir.h suggest this is to add a new entry to the ISDN directory.
newdir.h Contains named identifiers and function prototypes for newdir.c.
perm.c Contains functions (Window Procedure) related to a Dialog Box for setting Shared Application Permissions.
perm.h Contains named identifiers and function prototypes for perm.c.
phone.c Contains functions to support the Phone Dialog Box, including the Window Procedure.
phone.h Contains named identifiers and function prototypes for phone.c.
phmnu.h Contains named identifiers for used with Phone Menu.
phonpref.c Contains functions to support Phone Preferences Dialog Box.
phonepref.h Contains named identifiers and function prototypes for phonepref.c.

TABLE-continued (See the end of tgapp.c for a description of how invention starts up, and the order in which things are intialized.)

pkg.c

Contains functions which manange the Package Queue and take care of sending data from it to remote machines.
pkgtags.h Contains named identifiers for everything that can be sent in a Package to a remote PC.
proto.h Contains function prototypes for all publicly accessible functions in modules tmcpat.c, gdiobjcp.c, pkg.c, linklist.c, intercpt.asm, disp.c,
cache.c, and some Undocumented Windows functions.
sautil.cpp Contains functions to get the index of a given Application in our array of shared Applications, add such an Application to the array, and do the same thing for Annotation Bitmaps and Masks.
Contains functions for examing and changing Permissions and Modes of Host and Remote Users.
Contains functions for changed which Application is the current one.
Contains functions for adjusting the size and position of Remote Shared Application Windows.
scrol.h Contains named identifiers and structures supporting Video Sliders (Red, Green, Blue, Bright, Contrast).
sfset.c Contains functions to support SFSet Dialog Box (Shared File Settings).
sfset.h Contains named identifiers and function prototypes for sfset.c.
televid.c Contains functions to support various aspects of Video transmission among other things. At least one function is a Dialog Box Window Procedure.
televid.h Contains named identifiers and function prototypes for televid.c.
telegraf.c Contains functions to Initialize TeleGraphics, handle Messages meant for it, and add a Shareable Application.
telegraf.h Contains named identifiers for telegraf.c.
telegrap.h Contains name identifiers for all TeleGraphics Messages.
Contains prototypes for some functions in inputrtr.c, sautil.cpp, and draw.cpp.
tgapp.c Contains functions to Initialize a Shared Application and add it to the list of Shared Applications.
Contains functions to add an Annotation Channel, Initiate GDI capture.
tgapp.h Contains named identifiers, structure definitions and function prototypes for tgapp.c.
tgini.h Contains named strings for interpreting the TeleGraphics INI file.
tgmnu.h Contains named identifiers for TeleGraphics Menu.

TABLE-continued (See the end of tgapp.c for a description of how invention starts up, and the order in which things are intialized.)

tm3d.c

Contains functions to create a 3D box, a 3D line, and a "slab".
tm_mcs.c

This is the TeleMedia Manager and MCS Controller. There is some explanation in the file of their usage.
Contains Window Procedures for MCS and some Channel related functions.
tmapp.c Contains functions to support DDE things related to MCS, File Transfer, and Whiteboards.
tmapp.h Contains function prototypes for tmapp.c.
tmcapt.c Contains functions to capture Messages going through CallWndProc and GetMessage.
tmcapt.h Declarations of functions in tmcapt.c.
tmcaptp.h Contains definitions of structures for storing the parameters of all GDI and USER intercepted functions.
Contains definition of structures related to captured Window Procedure calls, information about Tasks and Calls, and Packaging.
tmmsg.h Contains named Messages for TeleMedia.
tmplay.c Contains functions to decode Packaged GDI calls and Play them through our local GDI.
tmplay.h Declarations of functions in tmplay.c.
tmscreen.c Contains functions which support the TeleMedia screen and controls (Buttons, etc.).
tmutil.c Contains some minor functions client Applications use to communicate with the user interface (Error Functions).
tmutil.h Contains named identifiers, named Messages, and function prototypes for tmutil.c.
trns.h Contains several function prototypes.
trnsrate.c Contains functions to support a Dialog Box to modify the Transfer Rate.
trnsrate.h Contains named identifiers and function prototypes for trnsrate.c.
tvbottom.c Contains functions to support a Dialog Box whose concern relates to TeleVideo.
tvbottom.h Contains named identifiers and function prototypes for tvbottom.c.
tvmnu.h Contains named identifiers for TeleVideo Menu.

TABLE-continued (See the end of tgapp.c for a description of how invention starts up, and the order in which things are intialized.)

tvpanel.c

Contains functions to support a Dialog Box which handles the video controls (Contrast, Brightness, etc.).

tvpanel.h

Contains named identifiers and function prototypes for tvpanel.c.

tvvideo.c

Contains a Dialog Box Procedure for TeleVideo which seems concerned with Video calls, transfers, and captures.
    Contains subsidiary functions that handle the above mentioned captures, transfers, and other necessary transactions.

tvvideo.h

Contains a couple of variable declarations and function prototypes for tvvideo.c.

udwgdi.h

Contains definitions of structures for maintaining information relevant to storing temporary GDI objects along with those actual objects.

umb.c

Contains main program of TeleMedia, and its Window Procedure.

umb.h

Contains named identifiers and function prototypes for umb.c.

umbmnu.h

Contains named identifiers for the umb Menu.

userpref.c

Contains functions for a Dialog Box concerned with User Preferences.

userpref.h

Contains named identifiers, variable declarations, and function prototypes for userpref.c.

vidcall.c

Contains functions for a Dialog Box for making Video Calls.

vidcall.h

Contains named identifiers, variable declarations, and function prototypes for vidcall.c.

videonum.c

Contains code for a Dialog Box relating to modifying the permissions of video channels.

videonum.h

Contains named identifiers, variable declarations, and function prototypes for videonum.c.

vidfsm.h

Contains named identifiers and function prototypes for the TeleVideo Finite State Machine.

vidset.c

Contains functions to support a Dialog Box to modify speech quality and resolution of video.

vidset.h

Contains named identifiers, variable declarations, and function prototypes for vidset.c.

TABLE-continued (See the end of tgapp.c for a description of how invention starts up, and the order in which things are intialized.)

vidwin.c

Contains functions for opening a Video Window, Playing video into it, capturing frames, adjusting the color, contrast, and such, and adjusting the size of the window.

vidwin.h

Contains named identifiers and function prototypes for vidwin.c.

What is claimed is:

1. A method of remote collaboration, comprising the following steps:

(a) running a remote program on each of a plurality of remote computers coupled to a host computer running a host program that is distinct from the remote program, wherein the host program generates an image that is communicated to the remote programs for output on each of the remote computers' displays;

(b) the remote programs each allowing the users of the remote computers to independently annotate the image generated by the host computer and output on the remote computers' displays;

(c) the remote programs each independently storing the image generated by the host program at a first location and storing the annotations to the image at a second location separate from the first location; and (d) the remote programs each communicating with the host program to cause the selective replication of the annotations at others of the remote computers.

2. A system for remote collaboration, comprising:

(a) a host computer interconnected with a plurality of remote computers, each with a display;

(b) means for running a remote program on each of the plurality of remote computers interconnected to the host computer running a host program, distinct from the remote program, wherein the host program generates an image that is communicated to the remote programs for output on each of the remote computers' displays;

(c) means for allowing each of the remote computers to independently annotate the image generated by the host computer and output on the remote computers' displays;

(d) means for the remote programs each independently storing the image generated by the host program at a first location and for storing the annotations to the image at a second location separate from the first location; and (e) means for the remote programs each communicating with the host program to cause the selective replication of the annotations at others of the remote computers.

* * * * *